No. 711,480. Patented Oct. 21, 1902.
M. CURRY.
BALING PRESS.
(Application filed Feb. 7, 1902.)
(No Model.) 6 Sheets—Sheet 1.
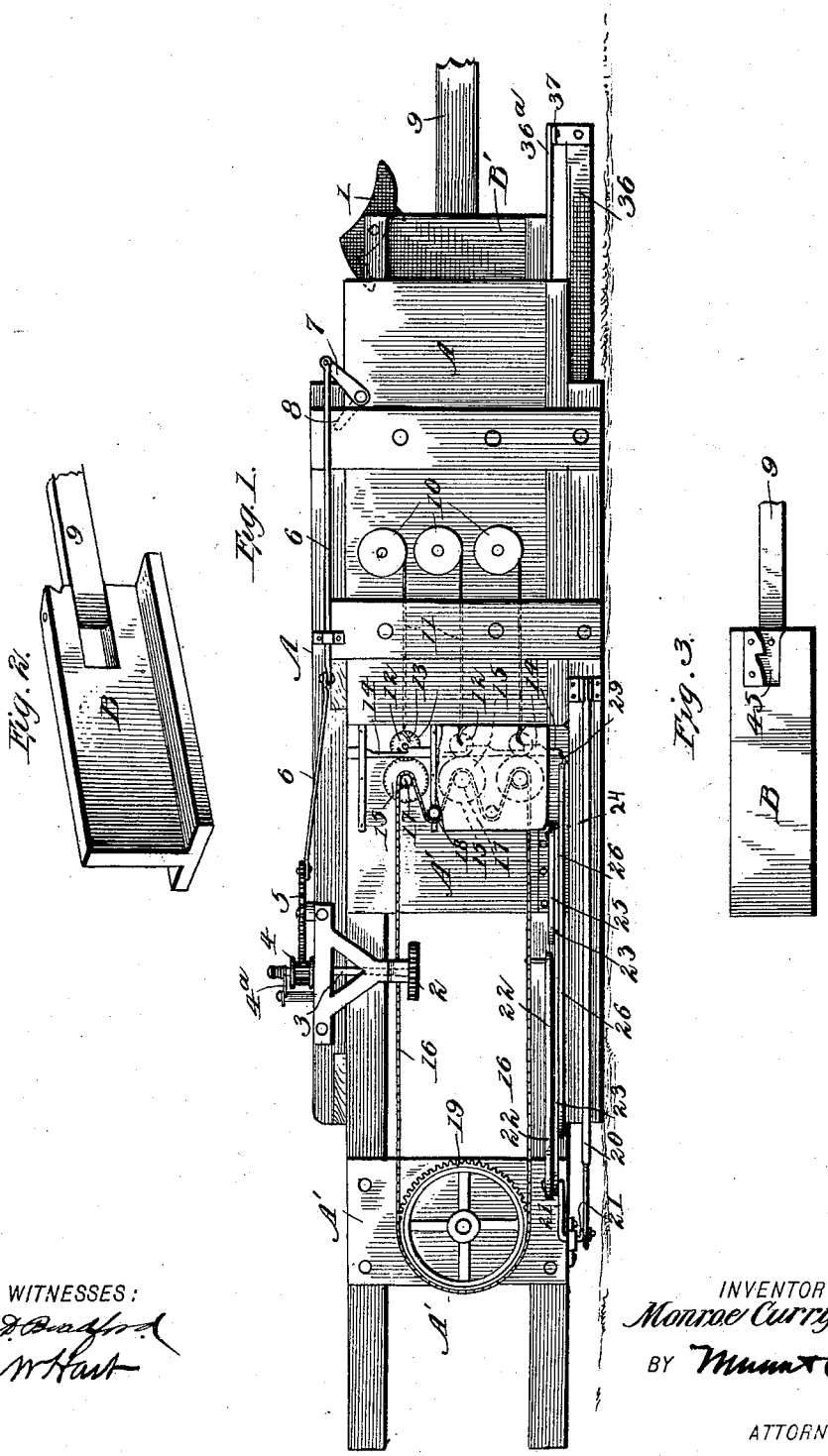
WITNESSES:
INVENTOR
Monroe Curry.
BY
ATTORNEYS No. 711,480. Patented Oct. 21, 1902.
M. CURRY.
BALING PRESS.
(Application filed Feb. 7, 1902.)
(No Model.) 6 Sheets—Sheet 2.
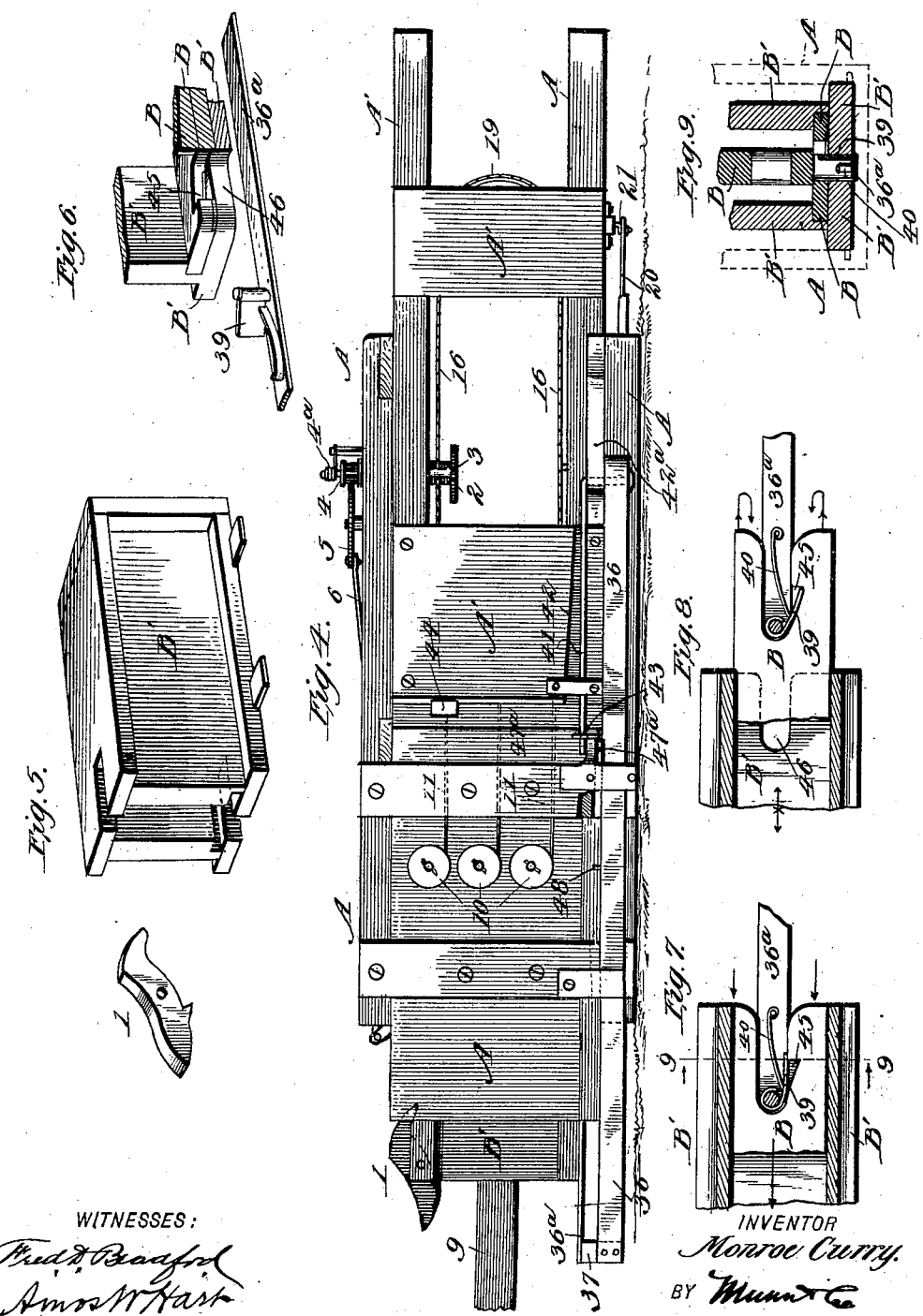
WITNESSES:
INVENTOR
Monroe Curry.
BY Munn & Co
ATTORNEYS No. 711,480. Patented Oct. 21, 1902.
M. CURRY.
BALING PRESS.
(Application filed Feb. 7, 1902.)
(No Model.) 6 Sheets—Sheet 3.
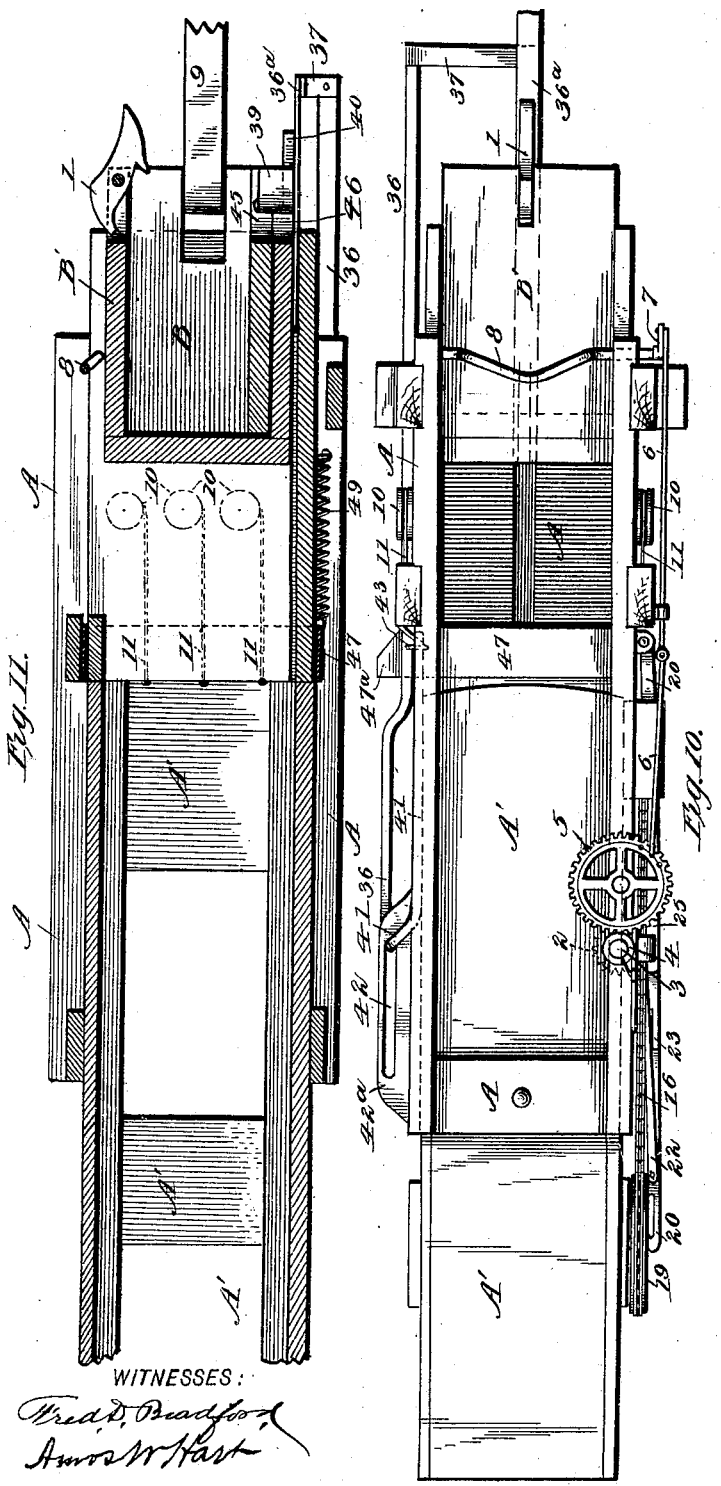
WITNESSES:
INVENTOR
Monroe Curry.
BY
ATTORNEYS

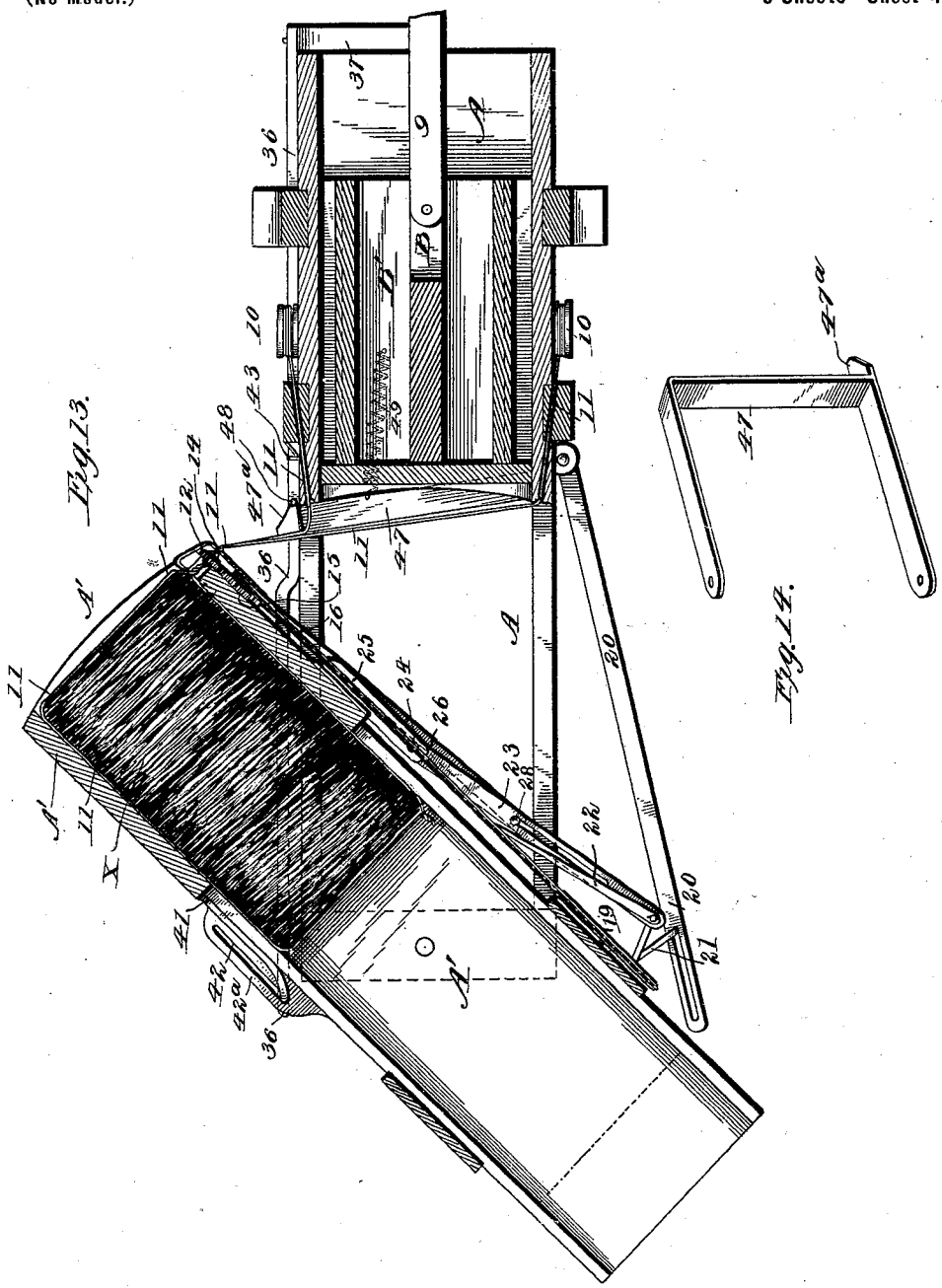

No. 711,480. Patented Oct. 21, 1902.
M. CURRY.
BALING PRESS.
(Application filed Feb. 7, 1902.)
(No Model.) 6 Sheets—Sheet 5.
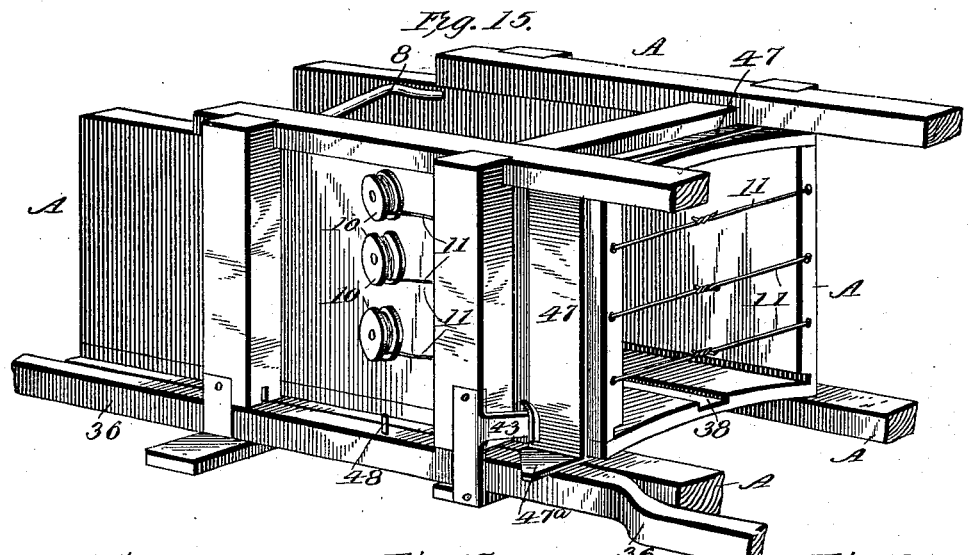
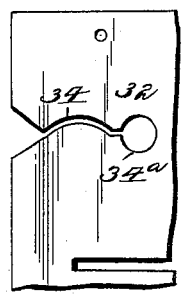
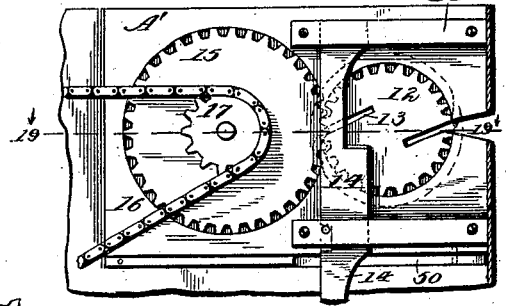
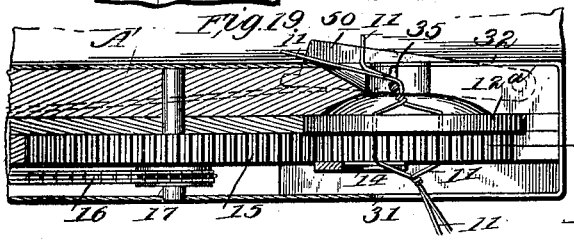
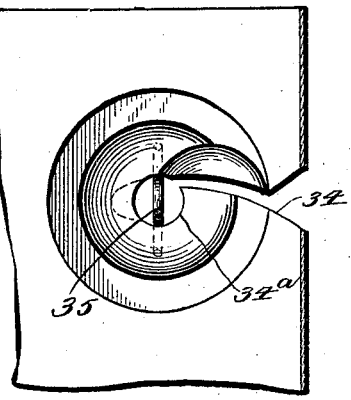
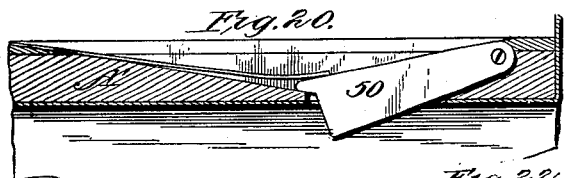
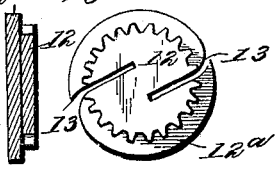
WITNESSES:
Fred P. Bradford
Amos W. Hart
INVENTOR
Monroe Curry.
BY Maunt Co.
ATTORNEYS

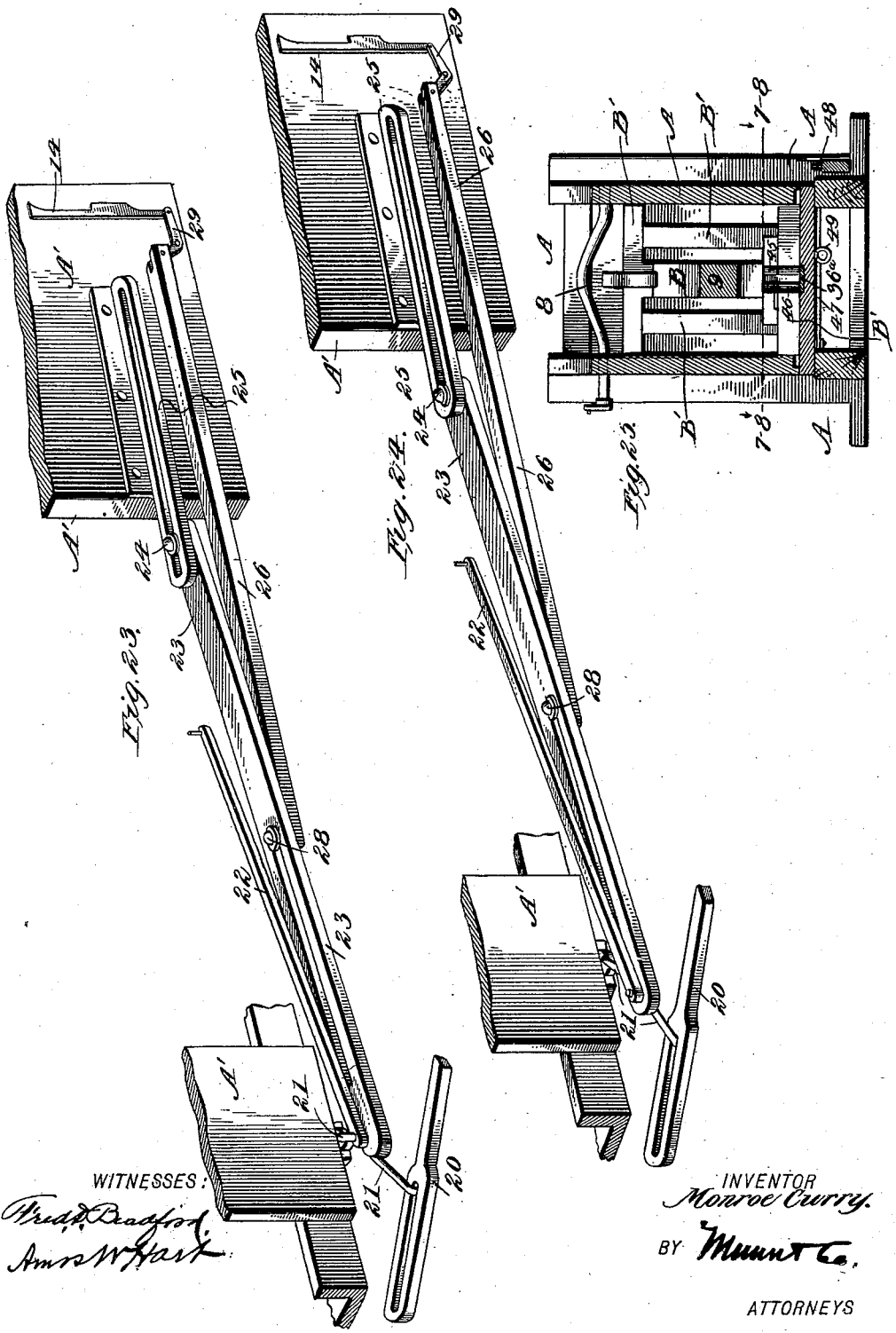

UNITED STATES PATENT OFFICE.

MONROE CURRY, OF KILLEEN, TEXAS, ASSIGNOR OF TWO-THIRDS TO WILLIAM P. ROBERTS AND MAX ROBERTS, OF KILLEEN, TEXAS.

BALING-PRESS.

SPECIFICATION forming part of Letters Patent No. 711,480, dated October 21, 1902.

Application filed February 7, 1902. Serial No. 92,955. (No model.)

*To all whom it may concern:*

Be it known that I, MONROE CURRY, a citizen of the United States, residing at Killeen, in the county of Bell and State of Texas, have made certain new and useful Improvements in Baling-Presses, of which the following is a specification.

My invention is an improvement in that class of automatic presses adapted for baling hay, cotton, excelsior, and similar materials, the latter being packed and compressed in the press box or chamber by means of a reciprocating plunger and wires being applied to the bale while being formed and subsequently twisted, knotted, and severed successively, after which the bale is ejected by the new one being formed.

The invention is embodied in the features of construction, arrangement, and combination of parts hereinafter described, and specifically indicated in the claims.

In the accompanying drawings, six sheets, Figure 1 is a side view of my improved press. Fig. 2 is a perspective view of the plunger proper. Fig. 3 is a bottom plan of the plunger. Fig. 4 is a side view of the press opposite that shown by Fig. 1. Fig. 5 is a perspective view of the detachable plunger-head and the gravity-catch which automatically locks it with and unlocks it from the plunger proper. Fig. 6 is a perspective view showing portions of the plunger proper and the plunger-head in section and also the slidable bar carrying a latch which engages the plunger proper and is automatically released therefrom as required. Fig. 7 is a horizontal detail section of the plunger proper and plunger-head, showing the locking-latch in the position it occupies when the plunger is being forced forward in the press box or chamber. Fig. 8 is a similar sectional view showing the plunger proper drawn partly out of the plunger-head and the latch engaged or locked therewith. The lines of section of Figs. 7 and 8 are indicated at 7 8 in Fig. 25. Fig. 9 is a vertical cross-section on the line 9 9 of Fig. 7. Fig. 10 is a top plan of the press. Fig. 11 is a central vertical longitudinal section of the press. Fig. 12 is a perspective view of a portion of the mechanism for locking the swinging portion of the press box or chamber and for rotating or swinging the same laterally. Fig. 13 is a horizontal section of the press, showing the pivoted swinging portion turned outward. Fig. 14 is a perspective view of a pivoted push bar or lever employed for insuring due engagement of the bale-wires with the twisters and knotters. Fig. 15 is a perspective view of the main or fixed portion of the press-box, certain parts being shown in section. Figs. 16 and 17 are side views of fixed plates forming attachments of one side of the swinging or movable part of the press-chamber and which form part of the wire twisting and knotting mechanism. Fig. 18 is a sectional side view of a portion of the movable or swinging part of the press-box, the same illustrating the wire-twisting device and the means for operating it. Fig. 19 is a horizontal longitudinal section of one side of the swinging portion of the press-box, the line of section being practically indicated at 19 19 on Fig. 18. Fig. 20 is another horizontal longitudinal section of the swinging portion of the press-box, illustrating one of the pivoted spring-dogs serving as detents for the bale. Fig. 21 is a sectional view illustrating an attachment of the movable portion of the press-box which forms part of the wire twisting and knotting mechanism. Fig. 22 includes a face view and a central transverse section of one of the wire-twisting wheels. Fig. 23 is a perspective view illustrating mechanism for operating the wire-twisters and wire-severing mechanism proper. Fig. 24 is a similar view, save that the movable parts are shown in another position which they assume in the course of operation. Fig. 25 is a vertical cross-section of the main or fixed portion of the press, the line of section being directly in front of the plunger proper.

In Figs. 1 and 4, which illustrate the two opposite sides of the press, A indicates the main or fixed portion of the press box or chamber, and A' the pivoted and swinging portion of the latter. As shown in Fig. 13, the part A' is so pivoted in the rear skeleton-frame extension of part A as to be adapted to be swung laterally, which is done for the purpose of carrying the wires that encircle the bale into the rotatable wheels, by which the twisting and the knotting of the wires are effected. When such part A' is swung back into alinement with the body or fixed part A, the bale X is gradually pushed out of the part A' by the material forced in by the plunger-head B' to form another bale. The plunger-head B' is normally engaged or locked with the plunger proper, B, by means of a gravity-catch 1, (see Figs. 1, 4, and 5,) and the said catch is released to allow disengagement of the parts B and B' only when a sufficient quantity of material has been forced into the swinging part A' of the press-chamber to form a bale of the requisite size. Such release is effected by the following means:
As shown in Figs. 1 and 10, a toothed wheel 2 is attached to a vertical shaft 3, hung in suitable bearings on the side of the rear portion of the frame of the fixed part A of the press-box and projects into the interior of the chamber—that is to say, into the path of the bale—so that when the latter is forced rearward the said wheel 2 is rotated by contact therewith. On the upper portion of the shaft 3 is fixed a lantern-pinion 4, which engages a spur-gear 5, pivoted centrally and horizontally and connected by a jointed rod 6 with the arm 7 of a trip-lever. (See Figs. 10, 11, and 25.) The said lever 8 is practically a bent bar having an obtuse angle and journaled in the upper front portion of the press-chamber A. By inspection of Figs. 1 and 10 it will be apparent that when the wheel 2 is rotated the wheel 5 will have a like motion and the rod 6 will throw the angle of the lever 8 downward into position to be engaged by the projecting and rounded upper portion of the catch 1. In other words, when a bale is being formed in the swinging part A' the wheel 2 is rotated by contact with it and the trip-bar 8 is eventually thrown down, so that the catch 1 releases the plunger B from the plunger-head B' and the former is drawn backward, leaving the head at rest within the part A. A pitman 9 is jointed to the plunger proper, B, and reciprocation is thus imparted to the latter by any suitable means—that is to say, by horse-power, steam-motor, or electric motor, &c. As shown in Fig. 1, a spring 4ª is connected with the shaft 3 of the toothed wheel 2 and serves to rotate said shaft, and thereby the gear 5, so that the trip-lever 8 is thrown back to its normal position by means of the rod 6 when the movable portion A' of the press-box swings laterally. It will be understood that the hay, cotton, or other material to be compressed and baled is delivered into the portion A of the press at a point in advance of the plunger-head when the latter is retracted, as shown in Fig. 10, and that as the plunger-head is reciprocated such material is forced forward and out of the fixed chamber A into the swinging portion A'. In such operation the wires required for tying the bale are carried with the latter and around it, as will be understood by reference to Figs. 13 and 15. As shown in these figures and also in Fig. 1, wire-spools 10 are pivoted to the side of the press-box A, and wires 11 are led off therefrom through slots or passages and extend across the inner end of the fixed part A, (see especially Fig. 15,) thus being in position to be engaged by the forming-bale, which, as it passes backward in the part A', draws the wires off the spools on opposite sides of the part A. When the required quantity of material has accumulated, the part A' of the press-box is swung laterally into the position shown in Fig. 13, whereby the wires 11 are drawn laterally into rotatable twisting and knotting wheels 12. (See Figs. 1, 18, and 22.) In Fig. 1 it will be seen that there are three spools 10 on each side of part A, and therefore three twisting and knotting wheels 12 are required. The said wheels are practically spur-gears having an enlarged circular portion 12ª adjacent to the teeth. (See Fig. 22.) Such circular portion works in frictional contact with a circular bearing formed in the sides of the press-box, as best illustrated in Figs. 18 and 19. In other words, the gear 12 has no pivot, but revolves in the circular cavity. It is provided with two slots 13, which open from opposite sides and are arranged at a slight angle to adjacent radii of the wheel, as shown in Figs. 18 and 22. It will be understood that one strand of each wire 11 enters one of the slots 13 and the other strand the opposite slot, and therefore when the gear 12 is rotated it is apparent that the two strands will be twisted together, as shown in Figs. 13 and 19. When this is done, the two strands are severed in quick succession by means of a cutter 14. The special means employed for operating the twisting-wheels 12 and the cutter 14 are as follows: Gears 15 (see Figs. 1 and 19) are journaled on the side of the swinging portion A' of the press-box adjacent to its forward end and severally mesh with the geared portions of the twisting-wheels 12. The gears 15 are rotated intermittently by means of a chain 16, which passes over sprocket-pinions 17, fixed to the said gears, and over intermediate sprocket-pinions 18 and a large sprocket-wheel 19, which is journaled in vertical position on the rear portion of the swinging part A'. It is apparent that if the chain 16 be caused to travel the requisite distance the gears 15 will be rotated, and thereby the twisters 12 will be rotated also, as required. This movement is effected by mechanism illustrated in Figs. 1, 13, 23, and 24. A bar 20 is pivoted to the fixed portion A of the press and slotted at its outer end. A two-armed crank-shaft or rocking lever 21 is journaled on the side of the swinging portion A' of the press-box, and its lower end works in the slot of the aforesaid bar 20, while its upper end is connected with two other bars 22 and 23. The bar 22 is connected at its forward end with the chain 16, as shown in Fig. 1, from which it will be seen that if the lever 21 be rocked the chain 16 will be caused to travel correspondingly. The bar 23 is slotted near its rear end and provided at its front end with a stud 24, which works in the slot of a bar 25, that is fixed to the side of the swinging press-chamber A'. A fourth bar 26 is arranged below the fixed slotted bar 25 and connected with an elbow-lever 29, that works a wire-cutter. (See especially Figs. 23 and 24.) The rear end of said bar 26 is slidably engaged with the movable bar 23 by means of a stud 28—that is to say, the said stud 28 is adapted to slide in the slot of bar 23. When the swinging part A' is in position— that is to say, in alinement with the fixed part A of the press-box, as shown in Figs. 1 and 10—the several bars 20 22 23 lie practically parallel to the side of the box, and the stud 24 of the sliding bar 23 is at the front end of the slot of fixed bar 25, and the lower arm of the crank-lever 21 is in the rear end of the slot in the lower bar 20. If now the part A' of the box be swung laterally, as indicated in Fig. 13, the bars and connected parts will first assume the position shown in Fig. 23—that is to say, the lower arm of the crank-lever 21 will ride back in the slot of the lower bar 20, and striking the end of said slot the lever will be rocked and the sliding bar 23 thereby drawn out, so that the studs 24 and 28 will assume the position shown in Fig. 23, and the chain 16 will at the same time be caused to travel by means of the connection of the bar 22 therewith, so that the gears 15 will rotate the twisting-wheels 12. When the part A' of the box is swung out to its farthest limit, the bars and the connected parts change their position slightly, as shown in Fig. 24—that is to say, the stud of bar 23 passes to the rear end of the slot of the fixed bar 25 and the bar 26 moves endwise to the left, whereby the cutter 14 (see Figs. 23 and 24) is operated. The said cutter is a bar arranged vertically and provided with a series of notches or shoulders which are duly beveled to furnish cutting edges. In practice there will be three cutting edges, corresponding to the number of wires. The cutter 14 is arranged to reciprocate vertically in suitable guides or keepers, and its lower end is pivoted to an elbow-lever 29, which is in turn pivotally connected with the front end of the sliding bar 26. It will be seen that when said bar passes from the position shown in Fig. 23 to that shown in Fig. 24 the elbow-lever will be rocked on its pivot, and the cutter-bar 14 thereby forced upward, so as to sever the wires. It will be understood that one strand of the wires enters one of the slots 13 of the twisting-wheels 12 and the other strand enters the opposite slot when the wheel is rotated as before described and, further, that the two strands are severed in rapid succession by the cutter 14. From Fig. 13 it will be noted that the wires 11 are twisted together on the inside of the wheels 12, and consequently when the wires are severed the strands that surround the bale X remain tied together and are forced out along with the bale, and also that the two ends of the wires which remain connected with the spools 10 are likewise twisted together and remain united in readiness for surrounding a new bale. In other words, they are left practically in the position shown in Fig. 15. For duly guiding the wires 11 into the twisting-wheels 12 I employ plates 31 and 32, (see Figs. 16 and 17,) which are provided, respectively, with the curved slots 33 and 34, leading in from their front edges. These plates, as shown in Fig. 19, are arranged, respectively, on the outer and inner sides of the swinging portion A' of the press-box and form practically a casing for the wire twisting and severing mechanism. It will be observed that the plate 32 is provided with an enlarged opening $34^a$ at the inner end of the slot 34. (See especially Fig. 21.) This opening is traversed by a bent bar 35, which is placed in that position in order to hold the wires 11 to the center of the twisting-wheels, so that the twist formed may be an even one. The bend of the said bar permits the knot of the wires to pass out easily after the wires have been severed.

I will now describe the means for latching, unlatching, and swinging the rear pivoted portion A' of the press-box. As shown best in Figs. 4 and 12, a bar 36 is arranged to slide lengthwise parallel to the side of the press-box A, it being suitably arranged in keepers and provided at its front end with what I term, for convenience, a "latch-bar" $36^a$, the same being parallel to the main bar 36 and connected therewith by a transverse rigid arm 37. The latch-bar $36^a$ slides in a groove 38, (see Fig. 15,) formed in the bottom of the press-box A. A pivoted latch 39 is arranged on the upper side of the bar $36^a$ and provided with a spring 40, which tends to press it laterally. This latch 39 engages the plunger B, as will be presently described. An elongated latch-bar 41 is pivoted to the rear end of the sliding bar 36 and suitably curved at its pivotal end to adapt it to work—that is, to slide in a slot 42, formed in an offset $42^a$ of the swinging portion $A^2$ of the press-box. The said latch-bar 41 extends forward in a slot or groove $41^a$, (see Fig. 12,) formed in the side of the part A', and extends forward (see Fig. 4) far enough to engage a catch 43, which is attached to the fixed portion A of the press. When the sliding bar is drawn forward, the latch 41 engages the catch 43, as shown in Fig. 4, and the swinging part A' is thus held rigidly in due alinement with the part A. To prevent the part A' from swinging too far, it is provided (see Fig. 4) with a stop 44, which engages the side of the part A. It is apparent that the groove $41^a$, being widened vertically, permits the latch 41 to be disengaged by hand from the catch 43 should occasion require; but in practice it is disengaged automatically when the bar 36 slides backward. The said bar is operated through the medium of the engagement of the latch 39 with the notch 45, (see Fig. 6,) formed in the bottom portion of the plunger B. (See also Figs. 7, 8, and 9.) The bottom of the plunger-head B' is provided with a notch 46, which coincides with the slot in the bottom of the plunger B, and differs from it in form only in respect to the aforesaid notch. As has been already indicated, the plunger B is normally held engaged with the plunger-head B' by means of the gravity-catch 1. While so engaged, the notch 45 of the plunger is in such coincidence with or in relation to the slot 46 of the plunger-head B' that the latch 39 is prevented from entering the notch by reason of contact with the side of the slot 46, (see Fig. 7;) but when the gravity-catch 1 is tripped by means of the lever 8, as before described, and the plunger B thereby released from the head the latter is left motionless in the box A, while the plunger is retracted, as before, and drawn out from the head B', as shown in Fig. 8, in which position the latch 39, pressing no longer against the side of the slot 46 of the head B', is free to engage the notch 45 of the plunger. Hence when the plunger B again moves inward the latch-bar 36 is carried with it, and the latch 41 is thereby withdrawn from engagement with the catch 43, which releases the swinging portion A' of the press-box, and the said bar 36 being forced still farther back the bent portion of the latch 41 striking the rear portion of the slot 42 the latter serves as a point of leverage for the bar 36, so that the part A' of the press-box is swung automatically into the position shown in Fig. 13. When the press-box has thus been carried to its limit outwardly, the plunger B is again locked with the head B' by means of the catch 1, and consequently the head travels with the plunger in the next outward movement, and the latch 39 in such case engages the inner ends of the slots in the plunger and plunger-head, so that the bar 36 is drawn forward, and the latch 41 again engages the catch 43 as the swinging part A' resumes its normal position. In other words, when the latch-bar 36 is drawn forward the bent portion of the latch 41 coming in contact with the front end of the slot 42 the press-box A' is swung back to its normal position, and the latch 41 again engages the catch 43, as before described. As has been already indicated, the release of the plunger B from the head B' through the medium of the trip-lever 8 occurs only when a bale has been fully formed and has been pushed back in the swinging part A' of the box, and then the plunger B is left free to move independently outward and become engaged or locked with the latch-bar 36ª through the medium of the latch 39, which engages its notched slot 45, and so when the plunger again moves inward the bar 36 releases the latch 41 and at the same time exerts a leverage on the swinging part A' proportionate to the distance between the slot 42 and the pivot of said part, so that the latter is swung laterally.

I propose to employ a device for insuring the proper engagement of the wires 11 with the twisting-wheels 12. It consists of a rectangular bar 47, (see Figs. 10, 13, and 14,) the same being pivoted to the fixed portion A of the press-box at one side and extending across the same and its vertical portion being parallel to and close to the opposite side of such part A. This bar 47 is provided with a bottom extension 47ª, (see Fig. 14,) which is engaged by a pin 48, (see Figs. 4 and 12,) fixed in the sliding latch-bar 36. It will be seen that as the latch-bar 35 slides rearward with the plunger B the said pin strikes the beveled projection 47ª and forces the lever into the inclined position shown in Fig. 13—that is to say, against the wires 11—whereby when the part A' of the box is swung to its outermost position the strands of the wires are forced together and carried into the slots of the twisting-wheels as required. When the latch-bar 36 is retracted, the said bar 47 is also retracted to its normal position by means of the spiral spring 49, (see Figs. 11 and 13,) the same being attached to the under side of the box A and suitably connected with the bar 47. As shown in Figs. 19 and 20, a pivoted dog 50 is arranged in a slot in the side of the swinging portion A' of the press-box and held normally pressed into the path of the bale by means of a spring. There will be a series of three dogs on each side of the part A', one being contiguous to each of the knotting-wheels. They serve to prevent the retraction of the bale, as will be readily understood. In further explanation I will state that in the forward movement of the plunger-head B' the inward limit of the movement is a little farther than the catching end of the dog 1 and a small distance into the adjacent end of the swinging part A' of the press, so that each charge will be deposited at that point where the dogs 50 will catch and hold it while the plunger-head recedes to receive another charge. It is also necessary for the hay to be deposited and held firmly in the swinging box far enough from the mouth of the latter to allow it to swing freely to the side without frictional contact of the hay with the adjacent end of the fixed or stationary box A; but it should also be noticed that the gravity-catch 1 never releases its hold at this limit of the inward movement of the plunger-head B', but the head must recede to a point clear of the end of the swinging box A'. At this point the gravity-catch 1 comes in contact with the trip-lever (or bent bar) 8 and is disengaged from the inner plunger or head B. Thus the latter is left at rest in fixed part A at a point where it cannot obstruct the necessary swinging movement of part A'. It should also be noted that if the bent bar 8 should come in contact with the gravity-catch 1 while the plunger B is moving forward the two plungers B B' would be held firmly together by the pressure of the hay until they reached their full forward movement, when the gravity-catch would again resume its hold and bring the plunger-head B' back until the catch 1 comes in contact with bar 8 on the retrograde movement of the plunger B.

It will be further understood that the toothed wheel 2 is engaged with the side of the bale in the box all the time that the swinging box A' is locked or latched in line with the main or fixed box A, and when hay is being pressed every charge causes the part already in the box A' to move a little toward the rear end of the box, and at every such movement of the hay the wheel 2 is rotated correspondingly and the bent bar 8 in consequence. Thus when the wheel 2 has rotated, and thereby measured the requisite distance on the side of the forming bale, the bent bar 8 will have gradually reached a point where it comes in contact with the gravity-catch 1, at which time the tripping and tying take place. Just at this juncture also, when the swinging press-box passes to the side, the pressed hay in the box necessarily loses its contact with wheel No. 2 as the swinging part A' moves laterally, since the wheel 2 is attached to frame of fixed box. When the hay is thus released from contact with the wheel 2, the spring 4ª causes it to rotate backward immediately to its former position.

The press may be arranged upon wheels so as to be portable or fixed in position, as conditions may require.

Having thus described my invention, what I claim as new, and desire to secure by Letters Patent, is—

1. In a baling-press of the character described, the combination with the fixed portion of the press-chamber, and the plunger adapted to reciprocate therein, of a swinging part adapted to move laterally, and means acted on by the plunger and adapted for automatically locking and releasing such swinging part, substantially as shown and described.

2. The combination, with the fixed portion of a press-chamber and a plunger adapted to reciprocate therein, of a rear portion which is pivoted and adapted to swing laterally, and means connected with and operated by the plunger, for automatically locking and releasing such swinging portion and also for moving the latter from its normal position and retracting the same, substantially as shown and described.

3. The combination, with the fixed portion of the press-box, and a rear portion pivoted thereto and adapted to swing laterally, of a plunger adapted to reciprocate in the fixed portion, and a sliding latch-bar adapted for automatic engagement with such plunger, and connected with the swinging portion, whereby, when the latch-bar is forced rearward, leverage is applied to the swinging part, for moving it laterally, substantially as shown and described.

4. The combination, with the fixed portion of the press-box, and a rear portion which is pivoted thereto and adapted to swing laterally, of a plunger adapted to reciprocate in the fixed portion of the box, a slidable latch-bar, having a pivoted latch adapted to engage the plunger, and extending rearward alongside the press-box, and an elongated latch connected with the rear end of said bar and extending forward alongside the swinging portion of the box and adapted for engagement with a catch located on the fixed portion of the box, substantially as shown and described.

5. The combination, with the fixed portion of the box, a swinging part pivoted therein and adapted to move laterally, a plunger-head adapted to reciprocate in the fixed portion of the box, a plunger proper, and a device which normally locks it with the said head, of means for automatically releasing the plunger and plunger-head when the bale is formed and forced rearward in the swinging portion of the box, and means adapted for automatic connection with the plunger when released, for unlatching the swinging portion of the box, and swinging the same laterally, substantially as shown and described.

6. The combination, with the fixed portion of the box, and the swinging portion pivoted therein, of a plunger adapted to reciprocate in the fixed portion of the box, means adapted for automatic connection with the plunger, for releasing the swinging portion of the box and moving the same laterally, wire-carrying spools attached to the side of the box, the wires being adapted to extend across the rear end of the fixed portion of the box, means connected with the plunger for unlatching and swinging the rear portion of the box, when the bale is formed, with the wires extending around it, and means for twisting and severing the wires as the swinging part moves laterally, substantially as shown and described.

7. The combination, with the fixed portion of the press-box and the swinging portion pivoted thereto, of a stop for limiting lateral movement of the swinging portion, a pivoted latch, and fixed catch on the fixed portion of the box, and a slidable bar with which the said latch is connected, so that as said bar is forced rearward the swinging portion of the box is released in the manner shown and described.

8. The combination, with the fixed portion of the press-box, and the laterally-swinging portion pivoted thereto, of a slidable bar whose rear end is connected with the swinging portion and adapted, when forced rearward to swing the same outward, substantially as shown and described.

9. The combination, with the fixed portion of the press-box, and the pivoted and laterally-swinging portion of the same, of a slidable bar suitably connected with the swinging portion, for exerting leverage thereon, a pivoted spring-catch arranged on said bar, and a plunger having a notch or shoulder with which said latch is adapted to engage, substantially as shown and described.

10. The combination, with the fixed portion of the press-box, and the swinging portion pivoted thereto, of a slidable bar connected with the swinging portion and having a spring-actuated latch, a plunger-head and plunger proper detachably connected and having coincident slots in their front ends, and the slot of the plunger having a lateral notch or shoulder, the said latch being so arranged that it engages the side of the slot in the head and is thus prevented from entering the notch in the plunger proper so long as the plunger and plunger-head are connected, substantially as shown and described.

11. The combination, with the fixed portion of the press-box, the swinging portion pivoted therein, a slidable plunger and plunger-head adapted for detachment from each other, of means for disengaging the same when a bale is formed, and a slidable bar connected with the swinging portion of the box and having a pivoted spring-latch as described, the said plunger and plunger-head having coincident slots adapted to receive the said latch, the slot of the plunger being provided with a lateral shoulder or notch, adapted to receive the latch when the plunger is disengaged from the head, substantially as shown and described.

12. The combination, with the fixed portion of the press-box and the laterally-swinging portion pivoted thereto, of a plunger-head and plunger proper, and a gravity-catch for locking the same detachably, a rocking trip-lever arranged for contact with said catch, a toothed wheel arranged in the path of the bale and adapted for engagement therewith, spring-retracted gearing connected with said wheel, and a rod connecting such gearing with the trip-lever, whereby, as a bale is formed and forced rearward, the trip-lever is thrown down, and the gravity-catch forced to release the plunger from the head, substantially as shown and described.

13. The combination, with the fixed portion of the press-box, and the pivoted portion adapted to swing laterally, of wire-feeding and wire-twisting mechanism, and means connected with the fixed and swinging portions of the press-box, for actuating the twisting mechanism as the pivoted portion swings outward, substantially as shown and described.

14. The combination, with the fixed portion of the press-box and the swinging portion pivoted thereto, of wire-supplying means and wire-twisting wheels provided with slots adapted to receive the wires, mechanism for rotating said wheels, and devices connected with the fixed and movable portions of the press-box which come into action as the movable parts swing laterally and actuate the wire-twisting mechanism, substantially as shown and described.

15. The combination, with the fixed portion of the press-box, means for supplying wire, of wire-twisting wheels journaled in the swinging portion and provided with slots for receiving the wires, of gears meshing with said wheels, a chain connecting the said gears in such manner as to rotate the same when caused to travel, and means connected with the fixed and movable portions of the press-box for causing said chain to travel as the pivoted portion swings laterally, substantially as shown and described.

16. The combination, with the fixed and swinging portions of the press-box, wire-twisting wheels and gears for rotating the same, and a chain operatively connected with said gears, of a rocking crank journaled on the side of the movable part of the press-box, a slotted push-bar 20 fulcrumed on the side of the fixed portion of the box and connected with the lower arm of such crank, and means for connecting the upper arm of said crank with the aforesaid chain, whereby, as the pivoted portion of the press-box swings laterally, the crank is shifted horizontally, and the chain caused to travel a corresponding distance, substantially as shown and described.

17. The combination, with the fixed portion of the press-box, the pivoted portion adapted to swing laterally, and means for feeding wire across the rear end of the fixed portion as described, of means for twisting the wires after the bale is formed, and a vertically-slidable cutter arranged on the side of the movable portion, for severing the wires, and means connected with such movable portion, for actuating such cutter after the bale is formed, substantially as shown and described.

18. The combination, with the fixed portion of the press-box, the pivoted portion adapted to swing laterally, and means for feeding the bale-wires across the rear end of the fixed portion, of means for twisting the wires after the bale is formed, a cutter arranged on the side of the movable portion and adapted to slide vertically in suitable keepers, a lever connected with such slidable cutter, a slidable bar connected with and adapted to vibrate said lever, and means connected with the fixed and movable portions of the press-box, for actuating said bar and thereby effecting the required movement of the cutter, for severing the wires after the swinging portion of the box has moved rearwardly, substantially as shown and described.

19. The combination, with the fixed portion of the press-box, the swinging portion pivoted therein, and means for supplying wire for the bale, of a vertically-slidable wire-cutter, an elbow-lever connected with the cutter and pivoted as described, a slidable bar connected with said lever at one end, and at its opposite end with a second bar which is slotted and adapted to move the first-named bar in both directions, a crank-lever connected with the second bar, and a third slotted bar 20 fulcrumed on the fixed portion of the press and having a slot, whereby it is connected with the said crank, substantially as shown and described, whereby, as the swinging portion of the press-box moves laterally, the crank is rocked and the cutter actuated in the manner described.

20. The combination, with the fixed portion of the press-box, the swinging portion pivoted therein, and the reciprocating plunger working in the fixed portion, of a device connected with such plunger and adapted to unlatch and exert leverage on the swinging portion, mechanism for twisting and severing the bale-wires successively as the swinging portion moves laterally, and means connected with the fixed and movable portions of the press-box and operatively connected with the aforesaid mechanism, whereby the latter is operated as the movable portion swings to its outer limit, substantially as shown and described.

21. The combination with the fixed portion of the press-box and the swinging portion pivoted therein, of wire-supplying means arranged on the sides of the fixed portion, slotted wheels arranged on the swinging portion for twisting the wires, a swinging or pivoted bar acting as pusher for insuring engagement of the wires with the slotted wheels, and a slotted bar, connected with the plunger and adapted for engagement with such pusher, substantially as shown and described.

MONROE CURRY.

Witnesses:
JOHN T. RUTHER,
A. H. CRABB.